United States Patent
Chevet et al.

(10) Patent No.: US 12,230,000 B2
(45) Date of Patent: Feb. 18, 2025

(54) METHOD AND APPARATUS FOR ENCODING/DECODING A POINT CLOUD REPRESENTING A 3D OBJECT

(71) Applicant: InterDigital VC Holdings, Inc., Wilmington, DE (US)

(72) Inventors: Jean-Claude Chevet, Cesson-Sevigne (FR); Yannick Olivier, Cesson-Sevigne (FR); Kangying Cai, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 199 days.

(21) Appl. No.: 17/046,642

(22) PCT Filed: Apr. 3, 2019

(86) PCT No.: PCT/US2019/025485
§ 371 (c)(1),
(2) Date: Oct. 9, 2020

(87) PCT Pub. No.: WO2019/199531
PCT Pub. Date: Oct. 17, 2019

(65) Prior Publication Data
US 2021/0183109 A1    Jun. 17, 2021

(30) Foreign Application Priority Data

Apr. 11, 2018 (EP) .................................. 18305431
Aug. 23, 2018 (EP) .................................. 18306132

(51) Int. Cl.
*G06T 9/00*          (2006.01)

(52) U.S. Cl.
CPC ..................................... *G06T 9/00* (2013.01)

(58) Field of Classification Search
CPC ........................................................ G06T 9/00
(Continued)

(56) References Cited

U.S. PATENT DOCUMENTS

| 7,003,136 | B1 | 2/2006 | Harville |
| 10,547,867 | B2 | 1/2020 | Ugur |

(Continued)

FOREIGN PATENT DOCUMENTS

| CN | 104854621 A | 8/2015 |
| CN | 105556965 A | 5/2016 |

(Continued)

OTHER PUBLICATIONS

Khaleb Mammou (PCC Test Model Category 2 v0, Oct. 2017, International Organisation for Standardisation Organisation Internationale De Norivialisation ISO/IEC JTC1/SC29/WG 11 Coding of Moving Pictures and Audio. (Year: 2017).*

(Continued)

*Primary Examiner* — Wednel Cadeau
(74) *Attorney, Agent, or Firm* — Condo Roccia Koptiw LLP

(57) ABSTRACT

At least one embodiment relates to a method comprising obtaining an occupancy information indicating if blocks of a 2D regular grid defined over a projection plane are associated with depth information of an orthogonal projection of at least one point of a point cloud onto said projection plane; embedding said occupancy information in an image storing said depth information; and encoding said image.

19 Claims, 13 Drawing Sheets

(58) Field of Classification Search
USPC .......................................................... 382/232
See application file for complete search history.

(56) References Cited

U.S. PATENT DOCUMENTS

| | | |
|---|---|---|
| 2003/0214502 A1 | 11/2003 | Park et al. |
| 2011/0007072 A1 | 1/2011 | Khan et al. |
| 2014/0119456 A1 | 5/2014 | Bivolarsky |
| 2014/0132721 A1 | 5/2014 | Martinez Bauza et al. |
| 2014/0204088 A1 | 7/2014 | Kirk et al. |
| 2014/0285486 A1 | 9/2014 | Chang et al. |
| 2015/0381968 A1 | 12/2015 | Arora et al. |
| 2016/0021355 A1 | 1/2016 | Alpaslan et al. |
| 2016/0086353 A1 | 3/2016 | Lukac et al. |
| 2016/0275690 A1* | 9/2016 | Siddiqui ................. G06T 11/60 |
| 2016/0307368 A1 | 10/2016 | Akeley et al. |
| 2017/0094262 A1 | 3/2017 | Peterson et al. |
| 2017/0214916 A1 | 7/2017 | Lu et al. |
| 2017/0214943 A1 | 7/2017 | Cohen et al. |
| 2017/0347055 A1 | 11/2017 | Dore et al. |
| 2017/0347120 A1 | 11/2017 | Chou et al. |
| 2018/0020238 A1 | 1/2018 | Liu et al. |
| 2019/0195616 A1 | 6/2019 | Cao et al. |
| 2019/0197739 A1 | 6/2019 | Sinharoy et al. |
| 2021/0174559 A1 | 6/2021 | Nakagami et al. |

FOREIGN PATENT DOCUMENTS

| | | |
|---|---|---|
| CN | 106662749 A | 5/2017 |
| CN | 107025673 A | 8/2017 |
| EP | 3151559 A1 | 4/2017 |
| EP | 3 301 926 A1 | 4/2018 |
| EP | 3340629 A1 | 6/2018 |
| JP | 2014112748 | 6/2014 |
| JP | 2014112748 A | 6/2014 |
| JP | 2016511457 A | 4/2016 |
| KR | 101284137 B1 | 7/2013 |
| RU | 2 241 933 C2 | 12/2004 |
| RU | 2 421 933 C2 | 6/2011 |
| WO | WO 2019/142666 A1 | 1/2001 |
| WO | WO 2016003340 A1 | 1/2016 |
| WO | WO 2018/039871 A1 | 3/2018 |
| WO | WO 2018050529 A1 | 3/2018 |
| WO | 2018/059946 A1 | 4/2018 |
| WO | 2019142163 A1 | 7/2019 |

OTHER PUBLICATIONS

Sinharoy et al., Lossless Coding in TMC2, Jan. 2018, International Organisation for Standardisation Organisation Internationale De Norivialisation ISO/IEC JTC1/SC29/WG 11 Coding of Moving Pictures and Audio (Year: 2018).*

KhalebMammou,PCCTestModelCategory2v0,Oct.2017,Internationalorganisationforstandardisation Organisationinternationaledenormalisationiso/IECJTC1/SC29/WG11Codingofmovingpicturesand Audio (Year: 2017).*

Sinharoyeal.,LosslessCodinginTMC2,Jan.2018,Internationalorganisationforstandardisation Organisationinternationaledenorivialisationiso/IECJTC1/SC29/WG11Codingofmovingpicturesand Audio(Year:2018) (Year: 2018).*

Caietal.SignalmultiplepointsalongoneprojectionlineinPCCTMC2losslessmode,Apr. 2018,International Organisationforstandardisationorganisationinternationaledenormalisationiso/IECJTC1/SC29/WG11Codingofmovingpicturesandaudio (Year: 2018).*

Cai et al., "Signal Multiple Points along One Projection Line in PCC TMC2 Lossless Mode", International Organization for Standardization, ISO/IEC JTC1/SC29/WG11, Coding of Moving Picture and Audio, Document MPEG2018/m42652, San Diego, CA, United States, Apr. 2018, 4 pages.

Anonymous, "Call for Proposals for Point Cloud Compression V2", International Organization for Standardization, ISO/IEC JTC1/SC29/WG11, Coding of Moving Picture and Audio, Document MPEG2017/N16763, Hobart, Australia, Apr. 2017, 21 pages.

Mammou, K. (Ed.), "PCC Test Model Category 2 v0", International Organization for Standardization, ISO/IEC JTC1/ SC29/WG11, Coding of Moving Picture and Audio, Document N17248, Macau, China, Oct. 2017, 11 pages.

Hoppe et al., "Surface Reconstruction from Unorganized Points", SIGGRAPH '92: Proceedings of the 19th Annual Conference on Computer Graphics and Interactive Techniques, Jul. 1992, pp. 71-78.

Lee et al., "Development of Underwater Terrain's Depth Map Representation Method based on Occupancy Grids with 3D Point Cloud from Polar Sonar Sensor System", 2016 13th International Conference on Ubiquitous Robots and Ambient Intelligence (URAI), Xian, China, Aug. 19, 2016, pp. 497-500.

Sinharoy et al., "Lossless Coding in TMC2", International Organization for Standardization, ISO/IEC JTC1/SC29/ WG11, Coding of Moving Picture and Audio, Document MPEG2018/m42170, Gwangju, Korea, Jan. 2018, 10 pages.

Plaza-Leiva et al., "Occupancy Grids Generation based on Geometric-Featured Voxel Maps", 2015 23rd Mediterranean Conference on Control and Automation (MED), Torremolinos, Spain, Jun. 16, 2015, pp. 766-771.

Cai et al., "Remove Occupancy Map Coding in PCC TMC2 Lossless Mode", International Organization for Standardization, ISO/IEC JTC1/SC29/WG11, Coding of Moving Picture and Audio, Document MPEG2018/m42653, San Diego, CA, United States, Apr. 2018, 4 pages.

Anonymous, "High Efficiency Video Coding", Series H: Audiovisual and Multimedia Systems, Infrastructure of Audiovisual Services—Coding of Moving Video, Recommendation ITU-T H.265, Feb. 2018, 692 pages.

Levkovish-Maslyuk et al., "Depth Image-Based Representation and Compression for Static and Animated 3-D Objects", IEEE Transactions on Circuits and Systems for Video Technology, vol. 14, No. 7, Jul. 2004, pp. 1032-1045.

Golla et al., "Real-Time Point Cloud Compression", IEEE/RSJ International Conference on Intelligent Robots and Systems (IROS), Hamburg, Germany, Sep. 28, 2015, 6 pages.

De Queiroz et al., "Compression of 3D Point Clouds using a Region-Adaptive Hierarchical Transform", IEEE Transactions on Image Processing, vol. 25, No. 8, Aug. 2016, pp. 3947-3956.

He et al., "Best-Effort Projection Based Attribute Compression for 3D Point Cloud", 2017 23rd Asia-Pacific Conference on Communications (APCC), Perth, Australia, IEEE, Dec. 11, 2017, 6 pages.

ITU-T, "High Efficiency Video Coding", Recommendation ITU-T H.265 Standard, Series H: Audiovisual and Multimedia Systems, Infrastructure of Audiovisual Services—Coding of Moving Video, Dec. 2016, 664 pages.

Cui, et al., "Hybrid Color Attribute Compression for Point Cloud Data", Proceedings of the IEEE International Conference on Multimedia and Expo (ICME) 2017, Jul. 10-14, 2017, 6 pages.

* cited by examiner

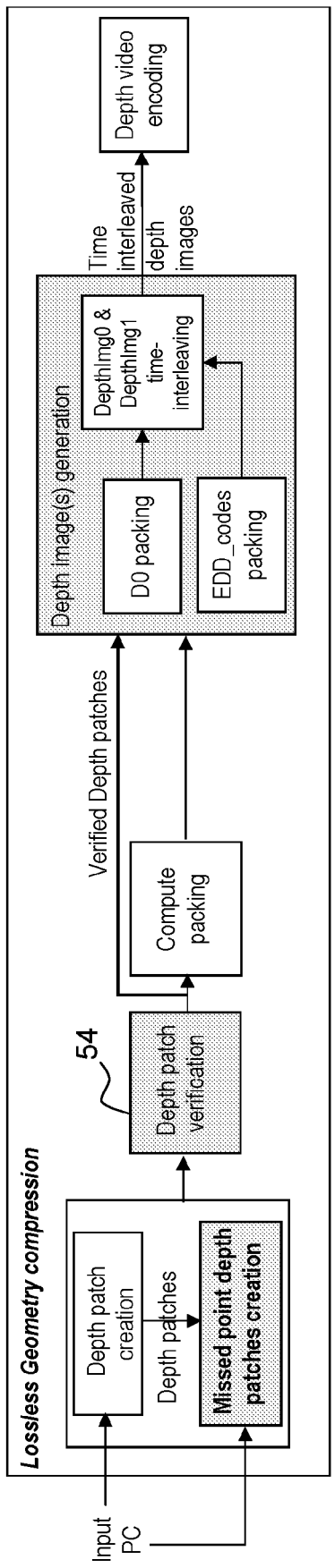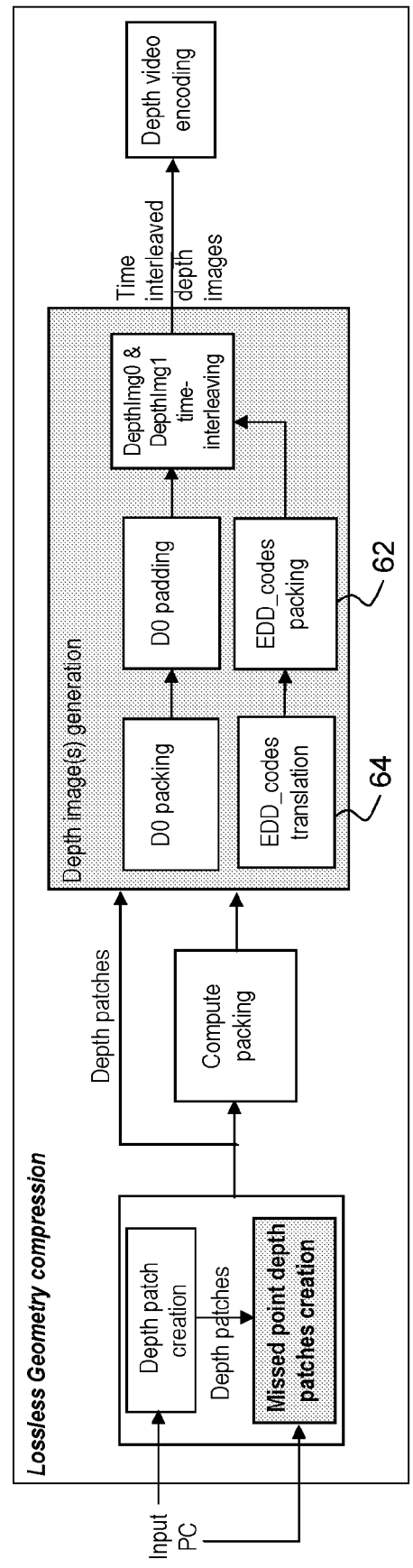

METHOD AND APPARATUS FOR ENCODING/DECODING A POINT CLOUD REPRESENTING A 3D OBJECT

CROSS REFERENCE TO RELATED APPLICATIONS

This application is the national stage entry under 35 U.S.C. § 371 of International Application PCT/US2019/025485, filed Apr. 3, 2019, which was published in accordance with PCT Article 21(2) on Oct. 17, 2019, in English, and which claims the benefit of European Patent Application No. 18305431.1, filed Apr. 11, 2018 and European Patent Application No. 18306132.4, filed Aug. 23, 2018.

FIELD

The present principles generally relate to coding and decoding of a point cloud representing a 3D object. Particularly, but not exclusively, the technical field of the present principles is related to projection based encoding/decoding of a point cloud.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A point cloud is a set of points usually intended to represent the external surface of a 3D object but also more complex geometries like hair or fur that may not be represented efficiently by other data format like meshes. Each point of a point cloud is often defined by a 3D spatial location (X, Y, and Z coordinates in the 3D space) and possibly by other associated attributes such as color, represented in the RGB or YUV color space for example, a transparency, a reflectance, a normal vector, etc.

A colored point cloud may be a set of 6-components points (X, Y, Z, R, G, B) or equivalently (X, Y, Z, Y, U, V) where (X, Y, Z) defines the spatial location of a point in a 3D space and (R, G, B) or (Y, U, V) defines a color of this point.

In the following, the term "point cloud" refers to any point cloud including a colored point cloud.

Colored point clouds may be static or dynamic depending on whether or not the point cloud evolves with respect to time. It should be noticed that in case of a dynamic point cloud, the number of points is not necessary constant but, on the contrary, generally evolves with time. A dynamic point cloud is thus a time-ordered list of sets of points.

Practically, colored point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such colored point clouds are typically static and huge.

Another use case is in topography and cartography in which, by using 3D representations, maps are not limited to the plane and may include the relief.

Automotive industry and autonomous cars are also domains in which point clouds may be used. Autonomous cars should be able to "probe" their environment to take safe driving decisions based on the reality of their immediate neighboring. Typical sensors produce dynamic point clouds that are used by the decision engine. These point clouds are not intended to be viewed by a human being. They are typically small, not necessarily colored, and dynamic with a high frequency of capture. They may have other attributes like the reflectance that is a valuable information correlated to the material of the physical surface of the sensed object and may help the decisions.

Virtual Reality (VR) and immersive worlds have become a hot topic recently and foreseen by many as the future of 2D flat video. The basic idea is to immerse the viewer in an environment all round him by opposition to standard TV where he can only look at the virtual world in front of him. There are several gradations in the immersivity depending on the freedom of the viewer in the environment. Colored point clouds are a good format candidate to distribute VR worlds. They may be static or dynamic and are typically of average size, say no more than a few millions of points at a time.

Point cloud compression will succeed in storing/transmitting 3D objects for immersive worlds only if the size of the bitstream is low enough to allow a practical storage/transmission to the end-user.

It is also crucial to be able to distribute dynamic point clouds to the end-user with a reasonable consumption of bandwidth while maintaining an acceptable (or preferably very good) quality of experience. Similarly to video compression, a good use of temporal correlation is thought to be the crucial element that will lead to efficient compression of dynamic point clouds.

Well-known approaches project a colored point cloud representing the geometry and colors of a 3D object, onto the faces of a cube encompassing the 3D object to obtain videos containing texture representing the color information of the point cloud and depth information representing the geometry information of the point cloud, and code the texture and depth videos using a legacy encoder such as 3D-HEVC (an extension of HEVC whose specification is found at the ITU website, T recommendation, H series, h265, https://www.itu.int/rec/T-REC-H.265-201802-I annex I).

Performance of compression is close to video compression for each projected point, but some contents may be more complex because of occlusions, redundancy and temporal stability when dynamic point clouds are considered. Consequently, point cloud compression is more demanding than video compression in term of bit-rates.

Regarding occlusions, it is virtually impossible to get the full geometry of a complex topology without using many projections. The required resources (computing power, storage memory) for encoding/decoding all these projections are thus usually too high.

A point cloud codec using a texture and depth projection scheme has recently been proposed during the 120th MPEG meeting. This scheme is described in the document ISO/IEC JTC1/SC29 WG11 Doc. N17248, Macau, CN, October 2017, in which the proposed scheme is called "Point cloud compression Test Model Category 2 version 0.0 (TMC2v0)".

This codec leverages existing video codecs to compress the geometry and texture information of a dynamic point cloud, by essentially converting the dynamic point cloud data into a set of different video sequences.

In particular, two video sequences, one for capturing the geometry information of the point cloud data and another for capturing the texture information i.e. the colors of points, are generated and compressed using existing video codecs, e.g. using the HEVC Main profile encoder.

Additional metadata that are needed to interpret the two video sequences, i.e., an occupancy map and auxiliary patch/block information, are also generated and compressed separately. The generated video bitstreams and the metadata are then multiplexed together so as to generate the final point cloud bitstream. The metadata are further encoded by an entropy codec such as an arithmetic codec.

The structure of an exemplary encoder 2 of this point cloud codec is represented on FIG. 1.

The encoder 2 comprises 3 main blocks: a geometry compression block 4, a metadata compression block 6 and a texture compression block 8.

The geometry compression block 4 comprises a depth patch creation block 10 which decomposes the input point cloud into depth patches.

The depth patch creation process 10 aims at decomposing the point cloud into a minimum number of depth patches with smooth boundaries, while also minimizing the reconstruction error. A depth patch represents one part of a point cloud by a group of pixels which are associated with depth values.

As an example, the following approach, detailed on FIG. 2, is implemented.

First, the normal at every point is estimated at 102 as described in Hugues Hoppe, Tony DeRose, Tom Duchamp, John McDonald, Werner Stuetzle, "Surface reconstruction from unorganized points". *ACM SIGGRAPH* 1992 *Proceedings*, 71-78.

An initial clustering of the point cloud is then obtained at 104 by associating each point with one of the following six oriented planes, defined by their normals:

(1.0, 0.0, 0.0),
(0.0, 1.0, 0.0),
(0.0, 0.0, 1.0),
(−1.0, 0.0, 0.0),
(0.0, −1.0, 0.0), and
(0.0, 0.0, −1.0).

More precisely, each point is associated with the plane that has the closest normal (i.e., maximizes the dot product of the point normal and the plane normal).

According to one embodiment, the six oriented planes described above are indexed as follows:

(1.0, 0.0, 0.0) is indexed by cluster index 0;
(0.0, 1.0, 0.0) is indexed by cluster index 1;
(0.0, 0.0, 1.0) is indexed by cluster index 2;
(−1.0, 0.0, 0.0) is indexed by cluster index 0;
(0.0, −1.0, 0.0) is indexed by cluster index 1;
(0.0, 0.0, −1.0) is indexed by cluster index 2.

Each point is then associated with the index of the corresponding cluster.

The initial clustering is then refined by iteratively updating the cluster index associated with each point based on its normal and the cluster indices of its nearest neighbors. According to one embodiment, for a considered point, if all its neighboring points, for example all the points for which the distance to the current point in 3D space is less than 2, are assigned to one cluster, noted as ClusterA, and the considered point is assigned to anther cluster, the cluster index of the considered point is updated to ClusterA.

Then, depth patches are extracted at 106 by applying a connected component extraction procedure, i.e. extracting neighboring points with the same cluster index to form a connected component. According to one embodiment, one connected component is built by grouping all points satisfying the following two conditions at the same time:

All points have the same cluster index.

For each point in the concerned connected component, there exists at least one point in the same connected component whose distance to the current point is less than a predefined threshold, for example equal to 1.

Each connected component is associated with a projection plane according to its cluster index (i.e. the cluster index of the points belonging to it). One embodiment is as follows:

YOZ plane for a connected component with cluster index 0;
XOZ plane for a connected component with cluster index 1;
XOY plane for a connected component with cluster index 2.

In order to better handle the case of multiple points along the same projection line, (where a projection line comprises the points with two same coordinates among three coordinates (X, Y, Z); for example, a projection line could consist of all points with the same (X, Y) coordinates) two depth patches are generated for each connected component, recording depth values D0 and D1, corresponding to the minimum and maximum depth values of the corresponding pixel and satisfying D1-D0<=SurfaceThickness, where SurfaceThickness is the maximum surface thickness, for example equal to 4.

More precisely, let {H(u,v)} be the set of points of the current connected component that get projected to the same pixel (u, v). The first depth patch, also called the near layer, stores the depth of the point in {H(u,v)} with the lowest depth D0. The second depth patch, referred to as the far layer, captures the point in {H(u,v)} with the highest depth within the interval [D0, D0+SurfaceThickness].

The depth patch creation block 10 is followed by a packing block 12 which maps all the projected connected components onto a 2D grid while trying to minimize the unused space, and guaranteeing that every T×T (e.g., 16×16) block of the grid is associated with a unique projected connected component, where T is a user-defined parameter that is encoded in the bitstream and sent to the decoder. Each point on the 2D grid corresponds to a pixel on an image.

The packing uses a simple packing strategy that iteratively tries to insert patches into a W×H grid, where W and H are user defined parameters, for example 1028×1028, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current image resolution can fit a patch, then the height H of the grid is temporarily doubled and search is applied again. At the end of the process, H is clipped so as to fit the used grid cells. The packing position, which is the position of the top left corner of the bounding-box of the projected area of each patch, in the 2D grid and the size of the projected area of each patch are signaled into the compressed bitstream.

An occupancy map is output from the packing block 12 to the metadata compression block 6. The occupancy map consists of a binary map that indicates for each cell of the grid whether it belongs to the empty space, i.e. is non-occupied, or to the point cloud, i.e. occupied, where one cell of the 2D grid would produce a pixel carrying depth or color information during the image generation process.

The geometry compression block 4 also comprises an image generation block 14 which exploits the 3D to 2D mapping computed during the packing process 12, more specifically the packing position and size of the projected area of each connected component, to store the geometry of the point cloud as images.

Corresponding to the fact that two depth patches are generated for each connected component, two images are generated to store the geometry of the point cloud, referred as DepthImg0 and DepthImg1.

The image generation block 14 of the encoder 2 is further detailed with reference to FIG. 3.

The image generation comprises a packing process (Depth D0 packing) in which, according to the packing position of the projected area of each patch, D0 values of each patch are copied to the corresponding part of the second grid.

The image generation also comprises a delta-depth determination in which, for each occupied pixel of depthImage0, delta_depth=D1−D0 (D1 and D0 being on the same projection line), and delta_depth is stored at the same position where the corresponding D0 value is stored.

The image generation also includes a time inverleaving as follows: (depthImage0_0, depthImage1_0, . . . , depthImage0_i, depthImage1_i, . . . , depthImage0_n, depthImage1_n), where depthImage0_i and depthImage1_i are generated from point cloud frame i.

The image generation also comprises a padding process 20 that aims at filling the empty space between patches in order to generate a piecewise smooth image suited for video compression. It uses a simple padding strategy, which proceeds as follows:

Each block of T×T (e.g., 16×16) pixels is processed independently.

If the block is empty (i.e., all its pixels belong to an empty space), then the pixels of the block are filled by copying either the last row or column of the previous T×T block in raster order.

If the block is full (i.e., no empty pixels), nothing is done.

If the block has both empty and filled pixels, then the empty pixels are iteratively filled with the average value of their non-empty neighbors.

The image generation block 14 is followed by a depth video encoding block 21 wherein the generated depth images are stored as video frames and compressed using any legacy video codec such as the HM16.16 video codec according to the HM configurations provided as parameters.

In the metadata compression block 6 of the encoder 2, the following metadata, called per patch/connected component metadata, is gathered then encoded for every connected component as follows:

Index of the projection plane
  Index 0 for the planes (1.0, 0.0, 0.0) and (−1.0, 0.0, 0.0);
  Index 1 for the planes (0.0, 1.0, 0.0) and (0.0, −1.0, 0.0);
  Index 2 for the planes (0.0, 0.0, 1.0) and (0.0, 0.0, −1.0).
2D bounding box (u0, v0, u1, v1) on the packed geometry/texture images;
3D location (x0, y0, z0) of the connected component represented in terms of depth shift δ0, tangential shift s0 and bi-tangential shift r0. According to the chosen projection planes, (δ0, s0, r0) are computed as follows:
  Index 0, δ0=x0, s0=z0 and r0=y0;
  Index 1, δ0=y0, s0=z0 and r0=x0;
  Index 2, δ0=z0, s0=x0 and r0=y0.

Also, mapping information providing for each T×T block its associated patch/connected component index, called as block-to-patch map, is generated and encoded as follows:

For each T×T block, let L be the ordered list of the indexes of the patches such that their 2D bounding box contains that block. The order in the list is the same as the order used to encode the 2D bounding boxes. L is called the list of candidate patches.

The empty space between patches on geometry/texture images is considered as a patch and is assigned the special index 0, which is added to the candidate patch list of all the blocks.

Let I be index of the patch which occupies the current T×T block and let J be the position of I in L. Instead of explicitly encoding the index I, its position J is arithmetically encoded instead, which leads to better compression efficiency.

Also, the metadata compression block 6 implements an encoding 22 of the occupancy map generated from the packing block 12.

The occupancy map compression leverages the block-to-patch mapping information described above, in order to detect the empty T×T blocks (i.e., blocks with patch index 0). The remaining blocks are encoded as follows, at 23.

The occupancy map could be encoded at 22 with a precision of a B0×B0 blocks, where B0 is a user-defined parameter. In order to achieve lossless encoding, B0 should be set to 1. In practice, B0=2 or B0=4 result in visually acceptable results, while significantly reducing the number of bits required to encode the occupancy map.

The block-to-patch map encoding 23 proceeds as follows:

Binary values are associated with B0×B0 sub-blocks belonging to the same T×T block. A value 1 is associated with a sub-block, if it contains at least a non-padded pixel, and 0 otherwise. If a sub-block has a value of 1 it is said to be full, otherwise it is an empty sub-block.

If all the sub-blocks of a T×T block are full (i.e., have value 1), the block is said to be full. Otherwise, the block is said to be non-full.

A binary information is encoded for each T×T block to indicate whether it is full or not.

If the block is non-full, an extra information indicating the location of the full/empty sub-blocks is encoded as follows:

Different traversal orders are defined for the sub-blocks. FIG. 4 shows the four considered traversal orders.

The encoder chooses one of the traversal orders and explicitly signals its index in the bitstream.

The binary values associated with the sub-blocks are encoded by using a run-length encoding strategy.

The binary value of the initial sub-block is encoded.

Continuous runs of 0s and 1s are detected, while following the traversal order selected by the encoder.

The number of detected runs is encoded.

The length of each run, except of the last one, is also encoded.

An occupancy map stream is output from the occupancy map encoding 22 and a block-to-patch map stream is output from the occupancy map 23. The block-to-patch indices and the occupancy map are called as per-block metadata.

The texture compression block 8 comprises a depth video decoding by a legacy decoder such as 3D-HEVC (an extension of HEVC whose specification is found at the ITU website, T recommendation, H series, h265, https://www.i- tu.int/rec/T-REC-H.265-201802-I annex I) followed by a geometry reconstruction process 24 that exploits the occupancy map information in order to detect the occupied pixels in the reconstructed geometry images. The 3D positions of the points associated with those occupied pixels are computed by levering the metadata and the geometry images. More precisely, let P be the point reconstructed from an occupied pixel (u, v) and let (δ0, s0, r0) be the 3D location of the connected component to which it belongs and (u0, v0, u1, v1) be the 2D bounding box of the corresponding depth patch. P could be expressed in terms of depth δ(u, v), tangential shift s(u, v) and bi-tangential shift r(u, v) as follows:

$$\delta(u,v)=\delta 0+g(u,v)$$

$$s(u,v)=s0-u0+u$$

$$r(u,v)=r0-v0+v;$$

where g(u, v) is the luma component of the reconstructed geometry image.

The point cloud geometry reconstruction process 24 also outputs, for each reconstructed point, the position of the pixel, which stores the depth value reconstructing the current point, i.e. (i, u, v), where i indicates the depth image, i.e. DepthImg0 or DepthImg1, and (u, v) are the coordinates of the pixel in the $i^{th}$ depth image.

The texture compression block 8 also includes a 3D color transfer block 26 in which the color and/or other attribute value, to be coded for each reconstructed point, is determined in a manner of minimizing color and/or other attribute information coding error. According to one embodiment, for each reconstructed point, the color of its nearest point in the input/original point cloud is assigned as its color to be coded.

The 3D color transfer block 26 is followed by a texture image(s) generation block 28 generating texture images to be coded by storing the color information to be coded of each reconstructed point in the same position as in the geometry images, i.e. (i,u,v).

The texture image(s) generation block 28 is followed by a texture video encoding using a legacy encoder such as 3D-HEVC (an extension of HEVC whose specification is found at the ITU website, T recommendation, H series, h265, https://www.itu.int/rec/T-REC-H.265-201802-I annex I).

The depth video stream generated from the geometry compression block 4, the per block and per patch metadata streams generated from the metadata compression stream 6 and the color video stream generated from the texture compression block 8 are multiplexed in a compressed stream output from the encoder 2.

FIG. 5 represents a decoder 30 corresponding to the encoder 2 for the reconstruction of the point cloud.

At the decoder 30, the compressed stream output from the encoder 2 is demultiplexed into a depth video stream, a per block metadata stream, a per patch metadata stream and a color video stream.

The decoder 30 comprises a geometry reconstruction block 31 which includes a depth video decoding by a legacy decoder such as 3D-HEVC (an extension of HEVC whose specification is found at the ITU website, T recommendation, H series, h265, https://www.itu.int/rec/T-REC-H.265-201802-I annex I).

The image reconstruction block 31 also includes an image reconstruction block 32 that is detailed in FIG. 6. This block 32 comprises:

time-deinterleaving reconstructed depthImage0 and reconstructed depthImage1 from the reconstructed depth video stream;

retrieving reconstructed D0 values stored in reconstructed depthImage0; and reconstructing D1 values using reconstructed_D0 reconstructed_Delta_Depth, where reconstructed_Delta_Depth values are stored in depthImage1.

The image reconstruction block 31 also includes a point cloud geometry reconstruction block 33 operating in the same manner as the point cloud geometry reconstruction block 24 of the encoder 2.

The decoder 30 also comprises a metadata reconstruction block 34 that includes:

an occupancy map decoding block 35 for decoding the occupancy map stream. The occupancy map output from this block 35 is sent to the depth image reconstruction block 32.

a block-to-patch map decoding block 36 for decoding the block-to-patch map stream. The block to patch map output from this block 36 is sent to the point-cloud geometry reconstruction block 33.

a per patch metadata decoding block 37 for decoding the per-patch metadata stream. The per patch metadata output from this block 37 is sent to the point-cloud geometry reconstruction block 33.

The decoder 30 further includes a texture reconstruction process including a texture video decoding stage by a legacy decoder such as 3D-HEVC (an extension of HEVC whose specification is found at the ITU website, T recommendation, H series, h265, https://www.itu.int/rec/T-REC-H.265-201802-I annex I).

The texture reconstruction process also includes a texture patch reconstruction stage in which texture patches are reconstructed using the reconstructed per patch and per block metadata.

Further, the texture reconstruction process includes a point cloud texture reconstruction stage 35 in which the color of each reconstructed point is fetched from the reconstructed texture images using the position of the pixel reconstructing each point.

A lossless variant of the encoder 2 of FIG. 1 has been proposed in the document ISO/IEC JTC1/SC29/WG11 MPEG2018/m42170, January 2018, Gwangju, Korea.

The basic idea of this lossless encoder 50, represented in FIG. 7, is to construct a special connected component which consists of all points missed by the connected components built by the encoder 2. Then, the corresponding extra depth patches and extra texture patches corresponding to the missed point patch are packed in the depth and texture images.

The points in the input point clouds which are not projected onto 2D video frames are called missed points. Those missed points compromise points positioned between the two points with minimum and maximum depth values along one projection line, points considered as noisy points, points belonging to components which are considered as too tiny for projection. All the missed points constitute a special connected component called as missedPointsPatch. The (x, y, z) coordinates of all missed points are stored in one 2D patch which will be stored in one 3D video frame separately or along with the other depth values.

For both lossy and lossless coding modes of FIGS. 1 and 7, besides the packed depth images and texture images, a significant part of the compressed bitstream includes the auxiliary information that helps to reconstruct the point cloud from the packed images and which includes:

Per-patch metadata including the normal axis, displacement at the normal direction, position on the packed image etc., Block-to-patch map indicating which patch each block in the packed image is occupied by, and Occupancy map indicating whether or not a pixel is occupied.

In the lossless point cloud coding of FIG. 7, the occupancy map is still necessary for reconstructing the point cloud because:

the occupied pixels with values to be coded equal to 0 need to be distinguished from the non-occupied pixels, which could also have values equal to 0, the un-occupied part of the packed image is filled in order to improve the compression performance. This operation is called as image padding.

However, the occupancy map itself is usually very expensive to be compressed, especially in lossless mode. In the lossless encoder 50 of FIG. 7, the cost of coding the occupancy map is much larger than the gain brought by image padding.

The European patent application n° 16306764.8 filed on Dec. 21, 2016 and published as EP3340629, proposes to reserve a foot-room in the depth value to be coded, i.e. the lower 2 bits of a codeword, to store the occupancy map. This is achieved by up-scaling the original depth data to be coded by left shifting a certain number of bits, for example left shifting 2 bits. However, as the up-scaling operation increases the data range drastically, the depth image becomes much more expensive to be coded.

For lossless coding mode, this up-scaling operation is an excess solution of removing occupancy map coding. Moreover, up-scaling doesn't resolve the issue of distinguishing occupied pixels with value "0" from un-occupied pixels.

SUMMARY

The following presents a simplified summary of the present principles to provide a basic understanding of some aspects of the present principles.

This summary is not an extensive overview of the present principles. It is not intended to identify key or critical elements of the present principles. The following summary merely presents some aspects of the present principles in a simplified form as a prelude to the more detailed description provided below.

Generally speaking, the present disclosure proposes a solution for improving the situation.

This disclosure proposes to reduce the decoding complexity and to save bitrates of lossless point cloud coding by removing occupancy map coding while keeping the data range to be coded unchanged.

Advantageously, the occupancy map coding is removed at both encoder and decoder sides.

Advantageously, the occupancy information is embedded in one of the depth images to be coded, for instance in the following manner:

if the occupancy information is embedded into DepthImg0, which stores the minimum depth values along projection lines, the depth patch generation step is modified to make sure that all depth values, and more particularly depth D0, to be coded are larger than 0;

if the occupancy information is embedded into DepthImg1, when DepthImg1 stores a difference delta_depth between minimum and maximum depth values along projection lines, one is added to all delta_depth values to be coded;

if the occupancy information is embedded into DepthImg1, when DepthImg1 stores the maximum depth values along projection lines, the depth patch generation step is modified to make sure that all depth values, and more particularly depth D1, to be coded are larger than 0.

Accordingly, the present disclosure provides a method comprising:

obtaining an occupancy information indicating if blocks of a 2D regular grid defined over a projection plane are associated with depth information of an orthogonal projection of at least one point of a point cloud onto said projection plane;

embedding said occupancy information in an image storing said depth information; and encoding said image.

The present disclosure also provides provides a device comprising means for:

obtaining an occupancy information indicating if blocks of a 2D regular grid defined over a projection plane are associated with depth information resulting of an orthogonal projection of at least one point of a point cloud onto said projection plane;

embedding said occupancy information in an image storing said depth information; and encoding said image.

Advantageously, embedding said occupancy information in an image storing said depth information comprises shifting the depth information to be stored.

According to an embodiment, the method further comprises transmitting information to indicate that the depth information has been shifted.

According to an embodiment, said image storing depth information of points of the point cloud having the smallest distances from the projection plane.

According to an embodiment, said image storing depth information of points of the point cloud having the largest distances from the projection plane.

According to an embodiment, said image storing depth information representative of the difference between depth information of points of the point cloud having the largest distances from the projection plane and depth information of points of the point cloud having the smallest distances from the projection plane.

The present disclosure also provides a method comprising:

decoding an image storing depth information of an orthogonal projection of at least one point of a point cloud onto a projection plane;

deriving and occupancy information from the decoded depth image, said occupancy information indicating if blocks of a 2D regular grid defined over said projection plane are associated with said decoded depth information.

The present disclosure also provides a device comprising means for:

decoding an image storing depth information of an orthogonal projection of at least one point of a point cloud onto a projection plane; and deriving and occupancy information from the decoded depth image, said occupancy information indicating if blocks of a 2D regular grid defined over said projection plane are associated with said decoded depth information.

The encoder/decoder modules are advantageously implemented by one or more processors within the encoder/decoder.

The methods according to the disclosure may be implemented in software on a programmable apparatus. They may be implemented solely in hardware or in software, or in a combination thereof.

Since the present invention can be implemented in software, the present invention can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The disclosure thus provides a computer-readable program comprising computer-executable instructions to enable a computer to perform the encoding/decoding method of the invention.

BRIEF DESCRIPTION OF DRAWINGS

In the drawings, examples of the present principles are illustrated. It shows:

FIG. 14 illustrates the geometry compression block modified according to a fourth embodiment of the present disclosure;

FIG. 15 illustrates the geometry compression block modified according to a fifth embodiment of the present disclosure;

Similar or same elements are referenced with the same reference numbers.

DESCRIPTION OF EXAMPLES OF THE PRESENT PRINCIPLES

Figure 1:
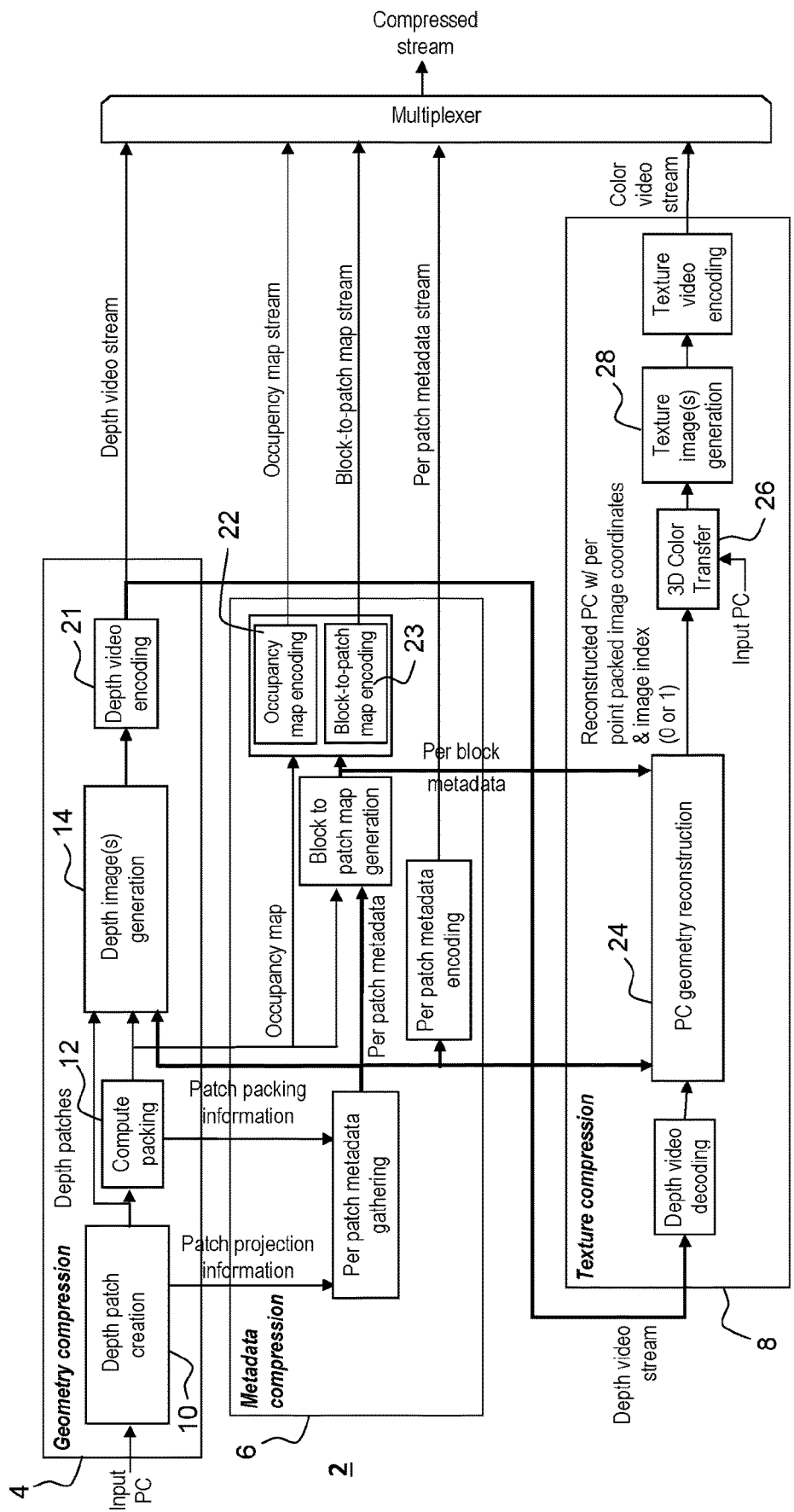
FIG. 1 already described shows an encoder.
Figure 2:
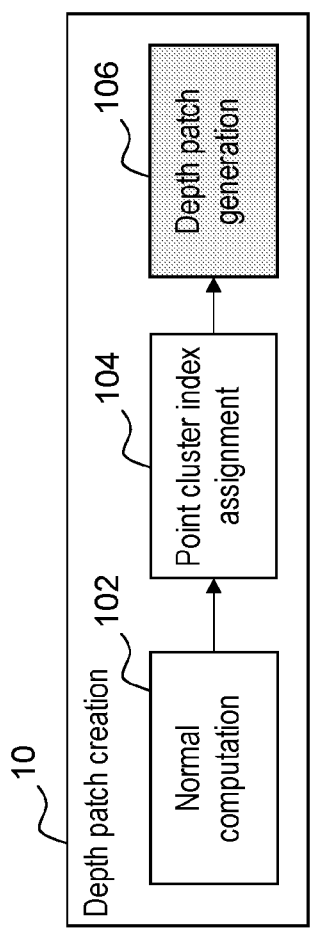
FIG. 2 already described illustrates the depth patch creation process of the encoder of FIG. 1.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for encoding/decoding a colored point cloud but extends to the encoding/decoding of a sequence of colored point clouds because each colored point cloud of the sequence is sequentially encoded/decoded as described below.

According to an embodiment, the lossless encoder 50 and the decoder 30 already described are used for the implementation of the present principles.

Figure 8:
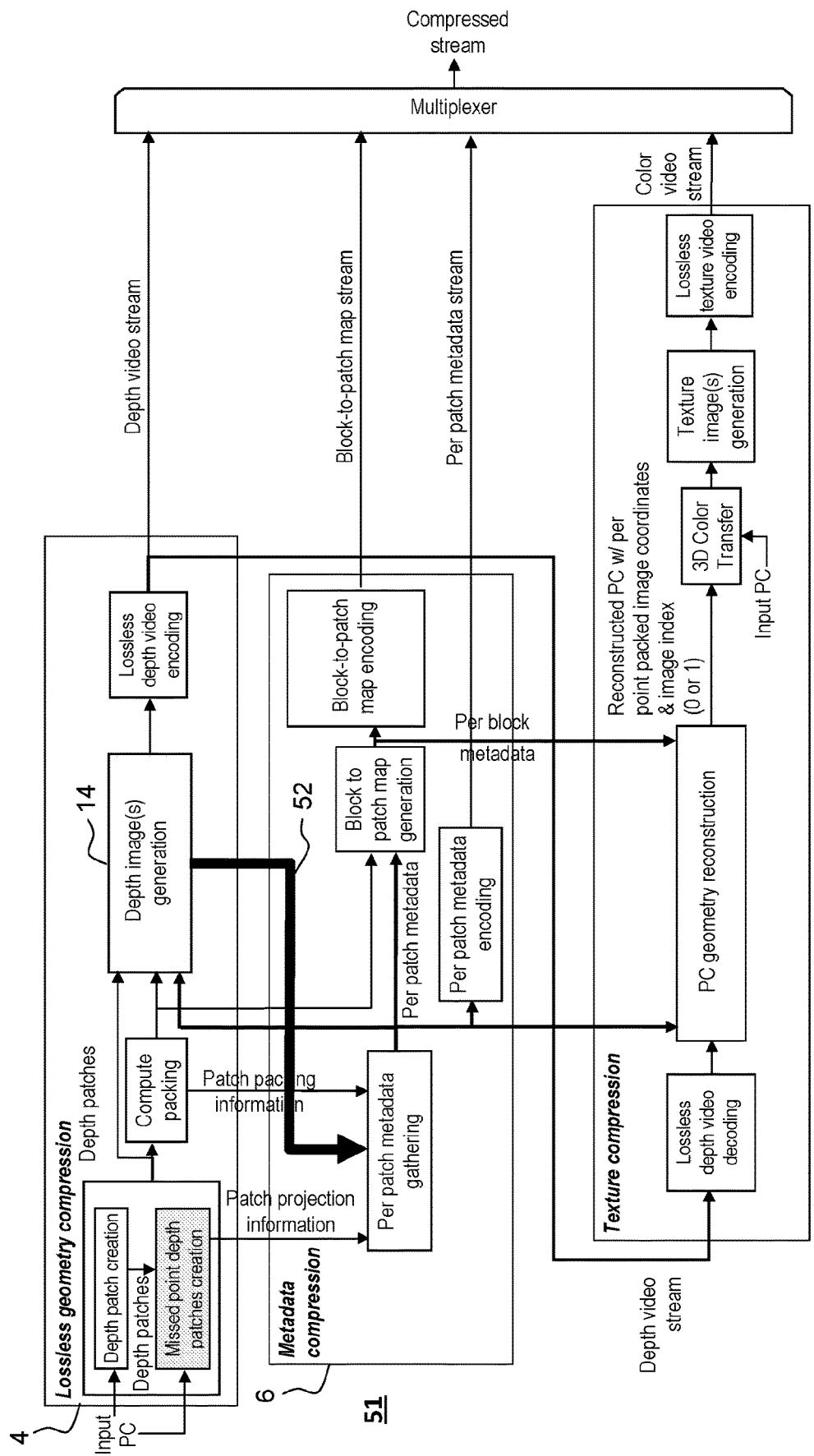
FIG. 8 shows modifications of the lossless encoder of FIG. 7 according to an embodiment of the present disclosure.

As it clearly appears on FIG. 8 representing a lossless encoder 51 modified according to an embodiment of the present disclosure, the occupancy map coding has been removed. Instead, the occupancy information is embedded in depth images to be coded and a link 52 is advantageously created between the image generation block 14 and the metadata compression block 6.

Figure 9:
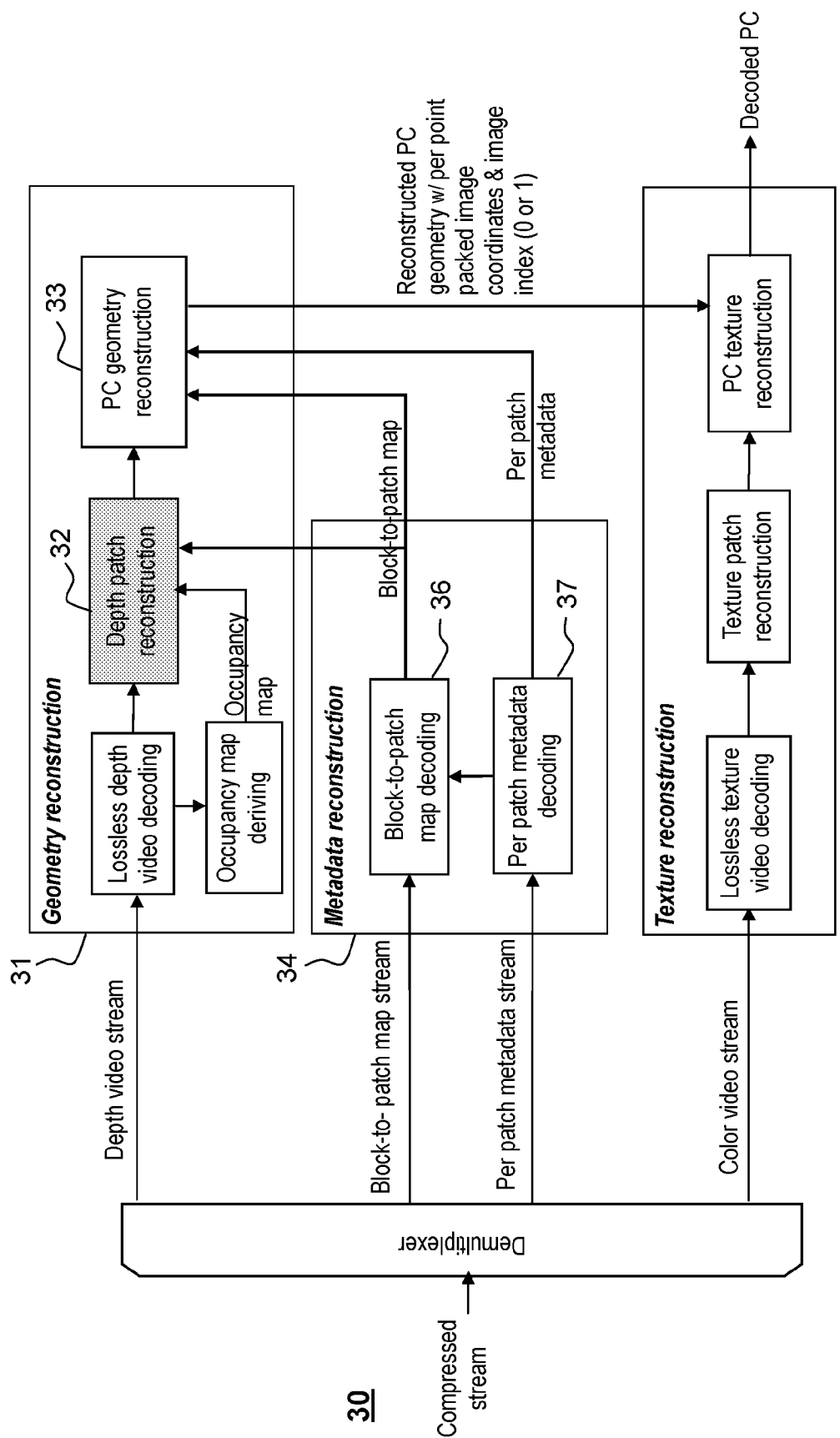
FIG. 9 shows modifications of the decoder of FIG. 5 according to an embodiment of the present disclosure.

Correspondingly, as it appears on FIG. 9 representing the decoder 30, there is no occupancy map stream in the compressed stream received by the decoder 30 and the bloc of decoding of the occupancy map 35 is suppressed.

Figure 3:
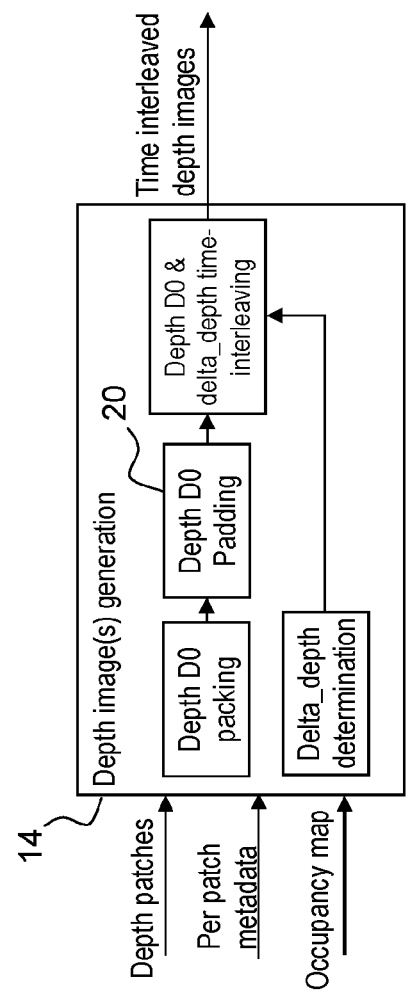
FIG. 3 already described illustrates the image generation process of the encoder of FIG. 1.
Figure 4:
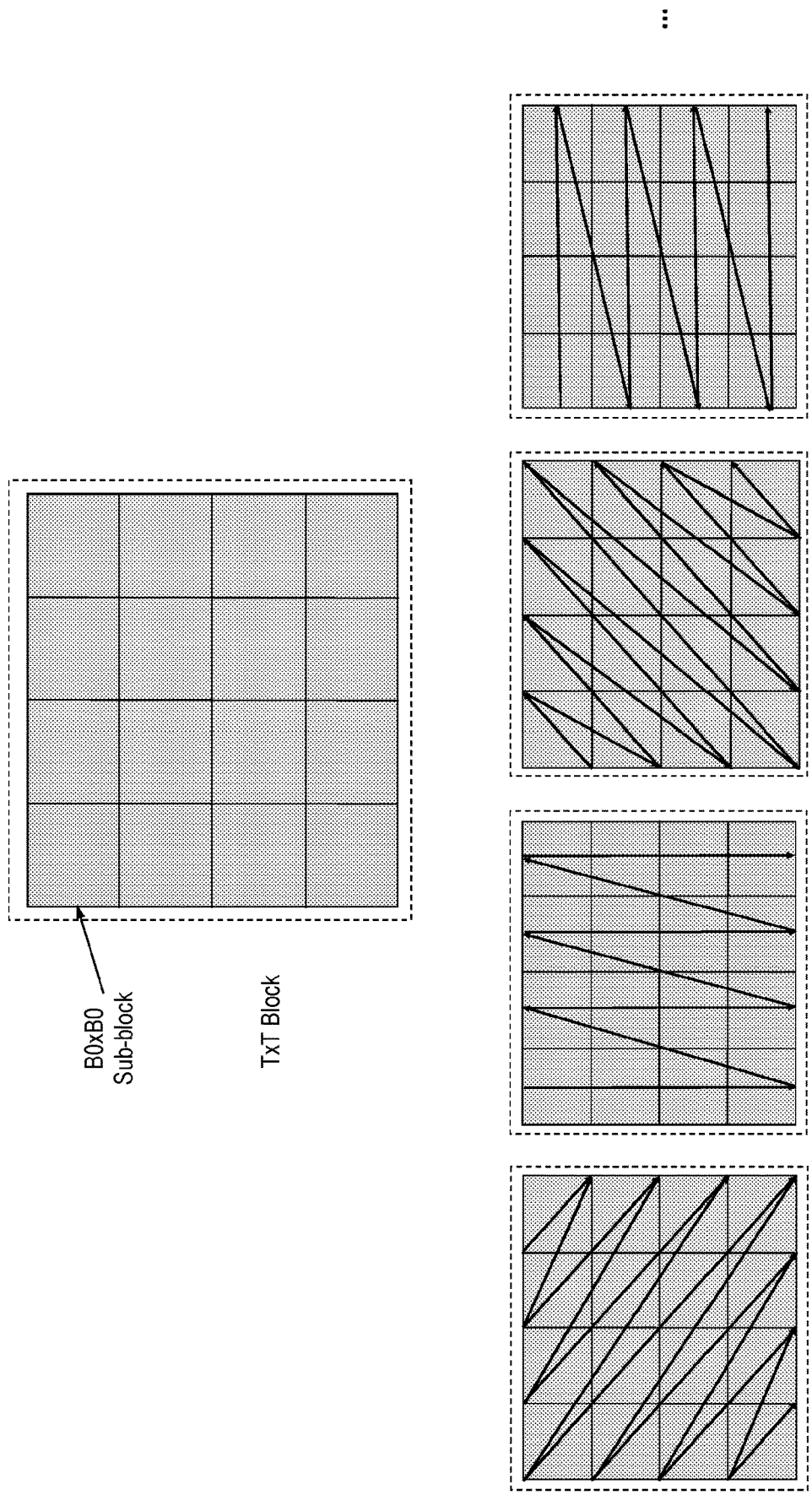
FIG. 4 already described shows examples of sub-blocks traversals used in the encoder of FIG. 1.
Figure 5:
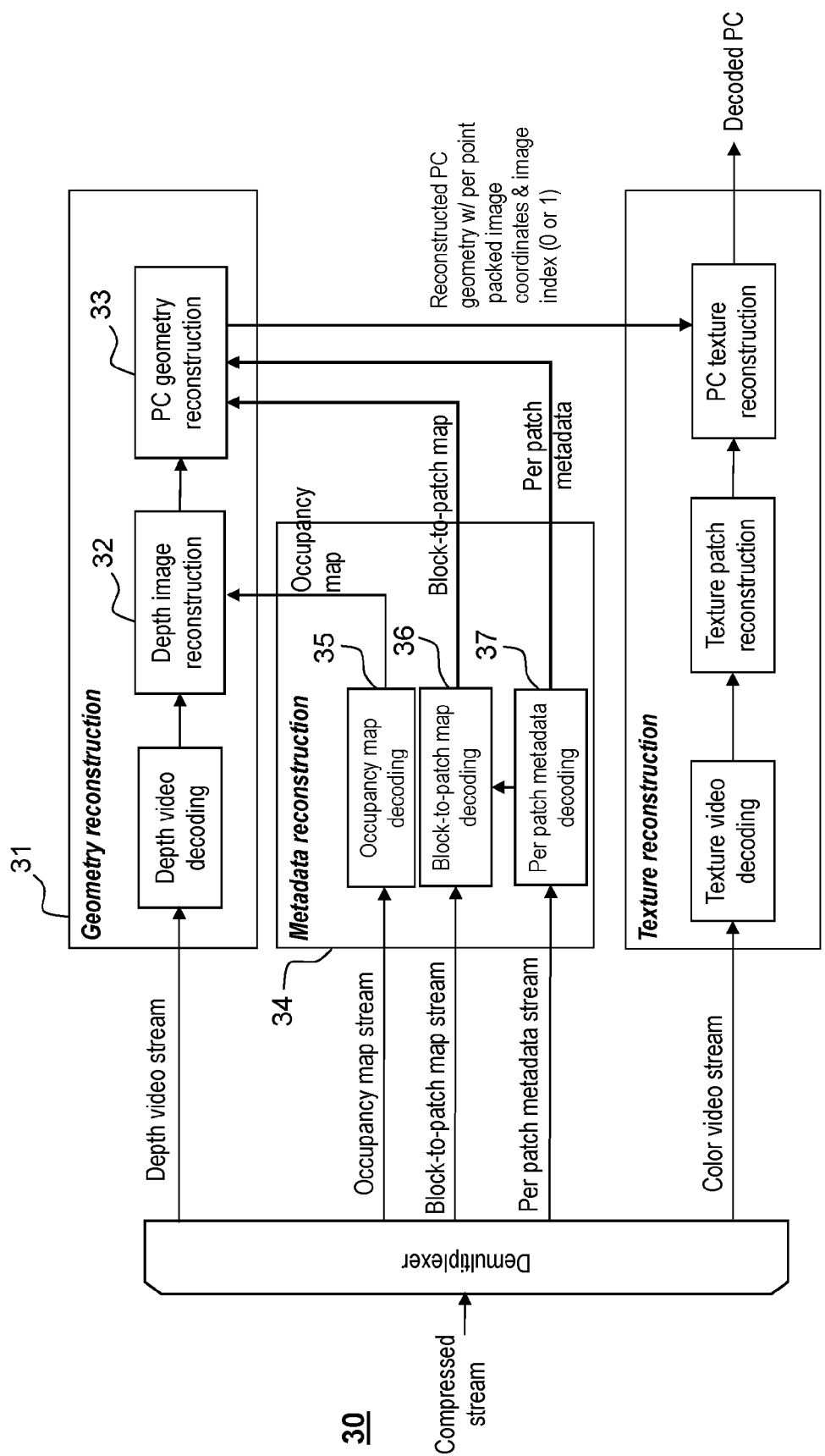
FIG. 5 already described shows a decoder.
Figure 6:
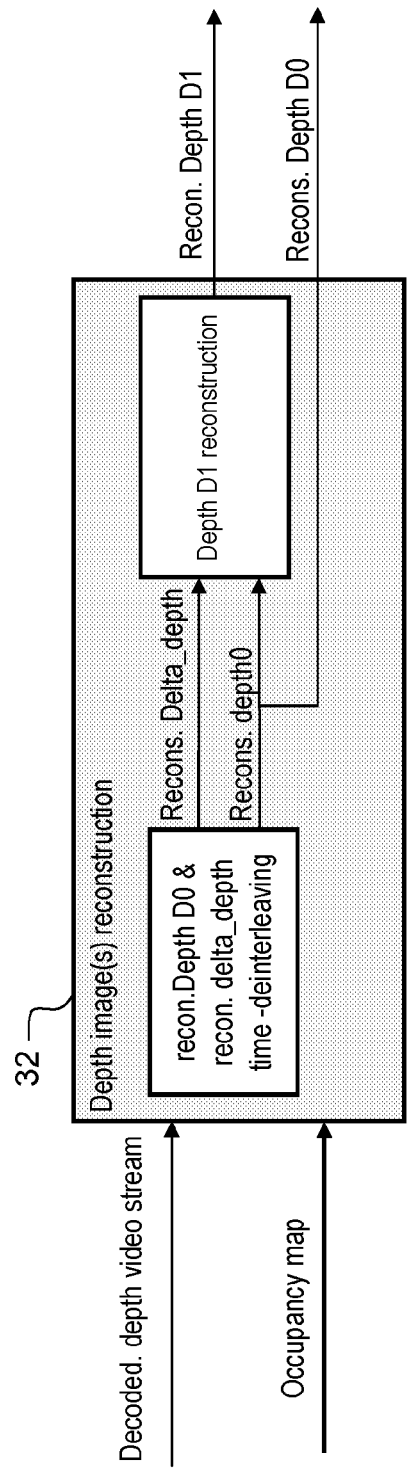
FIG. 6 already described illustrates the image reconstruction process of the decoder of FIG. 5.

As described with reference to FIG. 3 illustrating the image generation block 14, two points are recorded, which generate the minimum and maximum depth values along each projection line, in the compressed bitstream. Correspondingly, the encoder 51 encodes two depth images DepthImg0 and DepthImg1 for each point cloud frame. The relative minimum depth value D0, which is the difference between the absolute minimum depth value along each projection line and the minimum depth value of the connected component which the projection line belongs to, is signaled in DepthImg0 while DeltaD=(D1−D0) is signaled in DepthImg1, where D1 is the relative maximum depth value, i.e. the difference between the absolute maximum depth value along each projection line and the minimum depth value of the connected component which the projection line belongs to.

It is worth to note that the minimum depth value of each patch is signaled in per-patch metadata.

Figure 10:
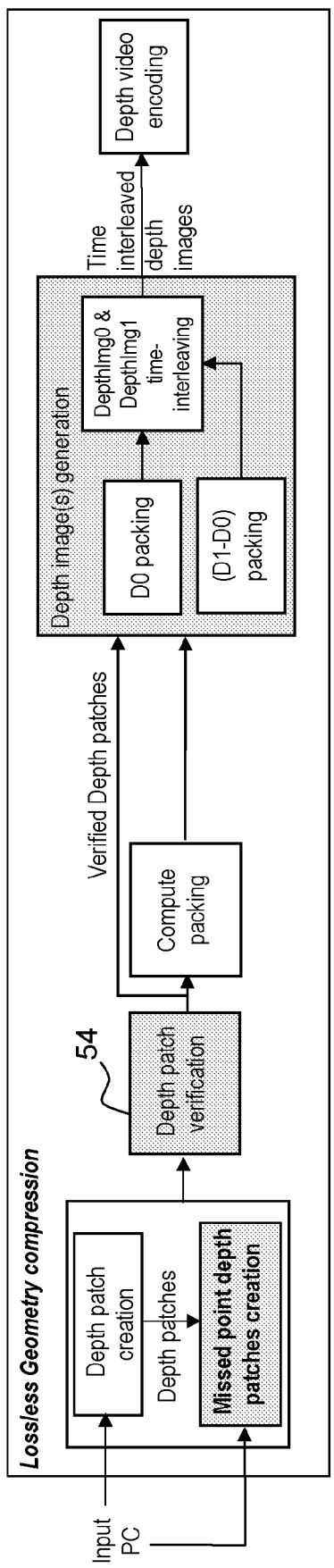
FIG. 10 illustrates the geometry compression block modified according to a first embodiment of the present disclosure.

According to a first embodiment represented on FIG. 10, the occupancy information is embedded in DepthImg0.

By making all D0 values larger than 0 and removing the padding step 20 of DepthImg0, as represented on FIG. 3, the lossless decoded D0 values can also reveal the occupancy information.

In order to make all D0 values larger than 0, a depth patch verification block 54 is added. This new block includes two stages.

During a first stage, connected components are split if necessary. If a D0 depth patch has a data range larger than the largest possible range [0, N−1], the corresponding connected component is split into two. The value of N depends on the coding bits. If 8 bit HEVC is used, N=255. If 10 bit HEVC is used, N=1023.

Then during a second stage, for each D0 patch, either D0 values to be coded or the minimum depth values of D0 patches are translated according to the following process:

If the minimum depth of a D0 patch, or the corresponding connected component, is larger than 0, the current minimum patch depth is reduced by one. Consequently, one is added to all the concerned D0 values to be coded. In this case, there is no need to change the reconstructed D0 values before using them for reconstructing the point cloud geometry.

If the minimum depth of a D0 patch, or the corresponding connected component, is already 0, the current minimum patch depth is kept unchanged. Then, one is added to all the D0 values to be coded of the current D0 patch. In this case, there is a need to decrease the reconstructed D0 values by one before reconstructing the point cloud geometry.

If necessary, one bit per patch, i.e. per connected component, is added to indicate whether the reconstructed D0 values need to be corrected before being used.

Figure 11:
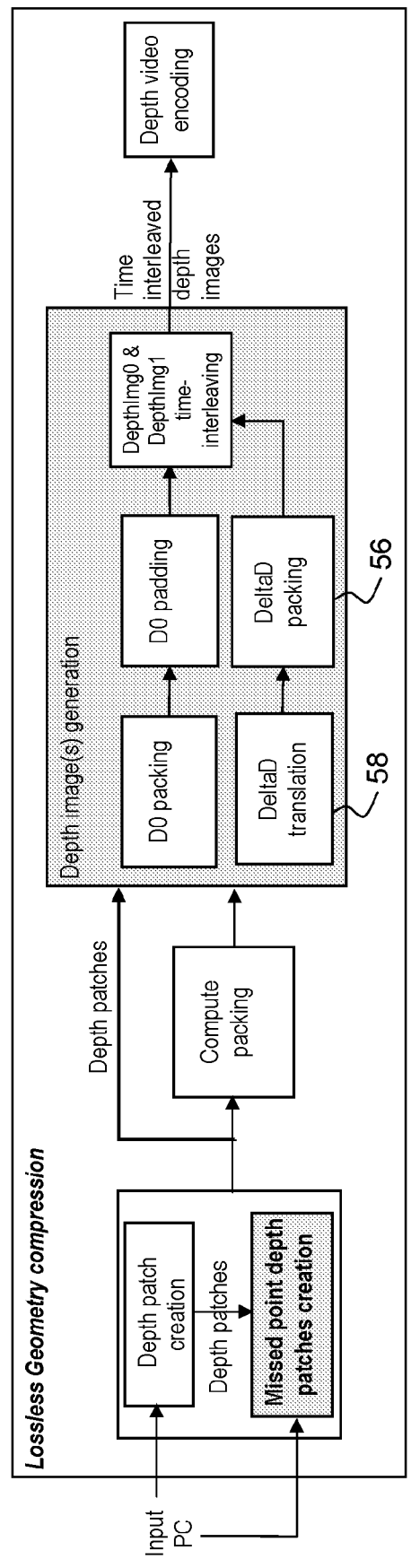
FIG. 11 illustrates the geometry compression block modified according to a second embodiment of the present disclosure.

According to a second embodiment represented on FIG. 11, the occupancy information is embedded in DepthImg1 when it stores DeltaD values.

According to this embodiment, all DeltaD values to be coded are increased by one before packing DpethImg1 at 56. As a big number of DeltaD values of the occupied pixels are 0, a translation stage 58 of DeltaD before coding is added. Correspondingly, the reconstructed DeltaD values are decreased by 1 before being used to reconstruct the point cloud at the decoder side.

Figure 12:
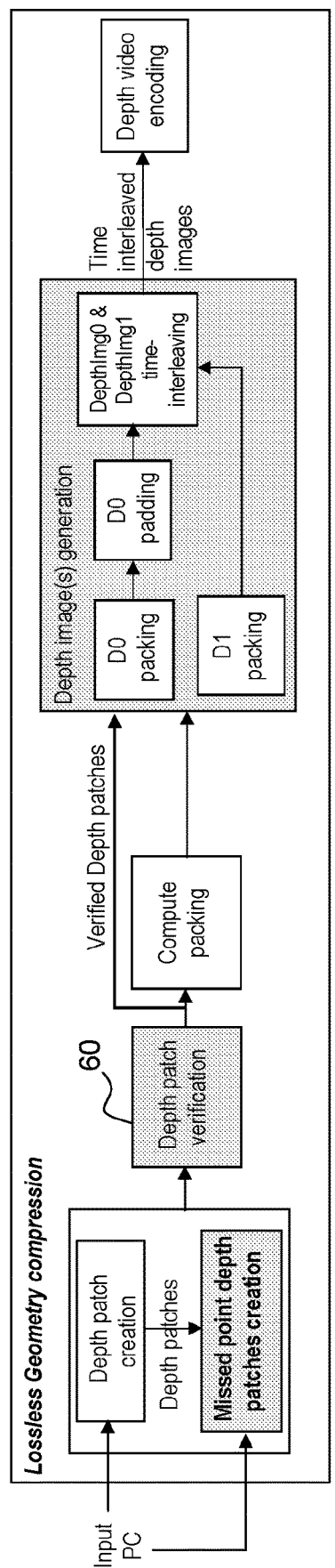
FIG. 12 illustrates the geometry compression block modified according to a third embodiment of the present disclosure.

According to a third embodiment represented on FIG. 12, the occupancy information is embedded in DepthImg1 when it stores the maximum depth values D1.

By making all D1 values larger than 0 and removing the padding step of DepthImg1, the lossless decoded D1 values can also reveal the occupancy information.

In order to make all D1 values larger than 0, a depth patch verification block 60 is added. This new block includes two stages.

During a first stage, connected components are split if necessary. If a D1 depth patch has a data range larger than the largest possible range [0, N−1], the corresponding connected component is split into two. The value of N depends on the coding bits. If 8 bit HEVC is used, N=255. If 10 bit HEVC is used, N=1023.

Then during a second stage, for each D1 patch, D1 values to be coded are translated according to the following process:

If the minimum D1 to be coded in a D1 patch is larger than 0, there is no need to change the reconstructed D1 values before using them for reconstructing the point cloud geometry.

If the minimum D1 to be coded in a D1 patch is 0, one is added to all the D1 values to be coded of the current D1 patch. In this case, there is a need to decrease the reconstructed D1 values by one before reconstructing the point cloud geometry.

One bit per patch, i.e. per connected component, is added to indicate whether the reconstructed D1 values need to be corrected before being used.

Figure 13:
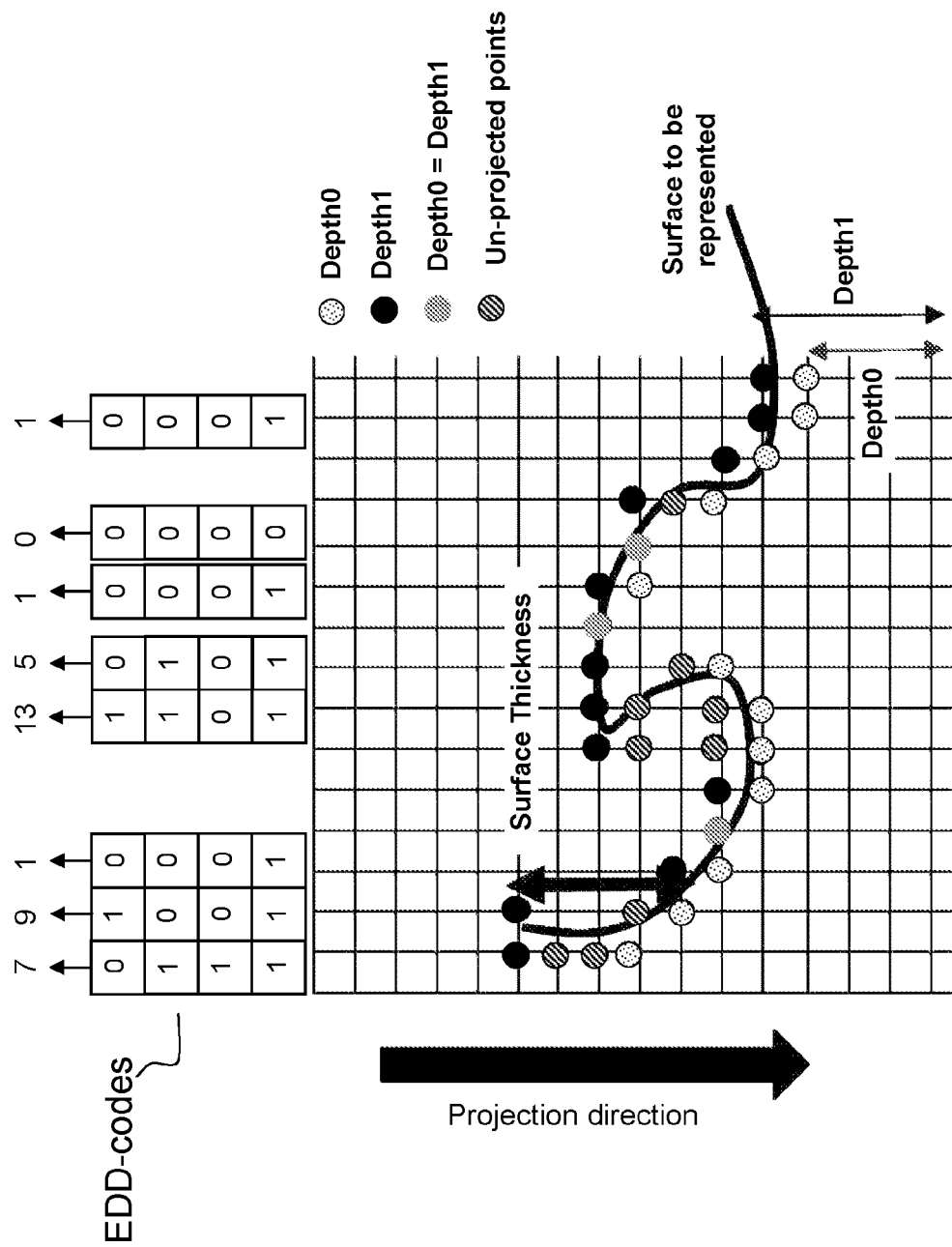
FIG. 13 illustrates an example of enhanced-delta-depth (EDD) codes according to an embodiment of the present disclosure.

Another possibility is to store in DepthImg1, instead of DeltaD or D1, enhanced-delta-depth (EDD) codes which are codewords concatenating bits indicating for each position along a projection line, between depth D0 and depth D1, whether or not this position is occupied, as illustrated on FIG. 13.

According to a fourth embodiment represented on FIG. 14, the occupancy information is embedded in DepthImg0 in the same manner as described in the first embodiment, and DepthImg1 stores these EDD codes.

According to a fifth embodiment represented on FIG. 15, the occupancy information is embedded in DepthImg1 when it stores EDD codes.

According to this embodiment, all EDD codes to be coded are increased by one before packing DepthImg1 at 62. As a big part of EDD codes of the occupied pixels are 0, a translation stage 64 of EDD codes before coding is added. Correspondingly, the reconstructed EDD codes are decreased by 1 before being used to reconstruct the point cloud at the decoder side.

Figure 7:
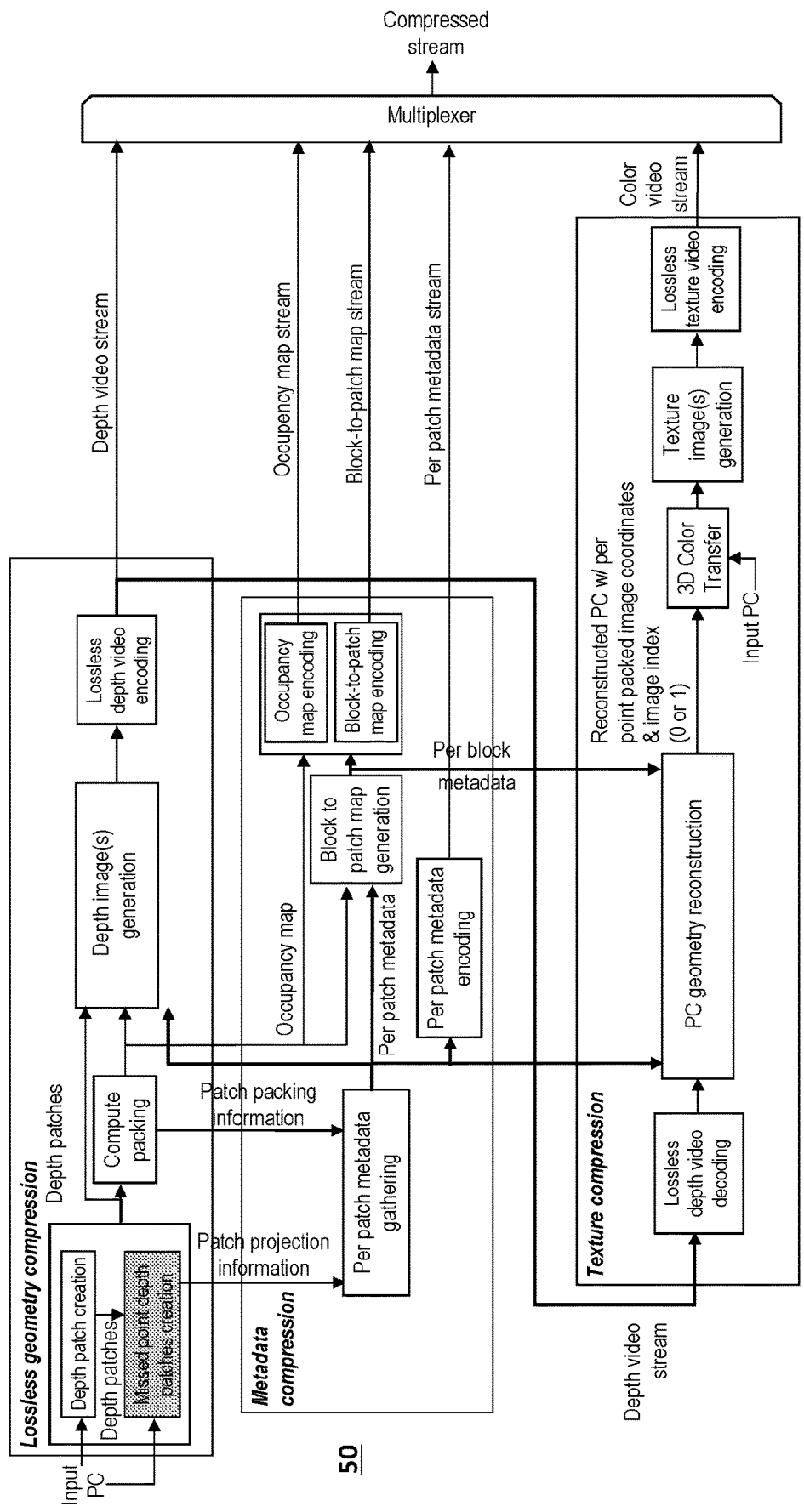
FIG. 7 shows a lossless encoder in which the present principles may be advantageously implemented.

Advantageously, the following metadata are added to the bitstream output by the encoder 51, compared with the encoder 50 of FIG. 7:
- one bit indicating whether or not the occupancy map is signaled in the bitstream. For example, 1 means yes and 0 means no.
- if the first bit equals to 0, one bit to indicate which depth image contains the occupancy information. For example, 0 means DepthImg0 and 1 mean DepthImg1.
- Several bits indicating which data is stored in DepthImg1. For example, two bits where 0 means that DepthImg1 stores D1, 1 means that DepthImg1 stores DeltaD=D1−D0, and 2 means that DepthImg1 stores EDD codes.
- If DepthImg0 carries occupancy information, one bit to indicate whether a per-patch one bit metadata is signaled along with per-patch metadata, which indicates whether or not the reconstructed D0 values of the current patch need to be corrected before being used to reconstruct the point cloud geometry.
- If DepthImg1 carries occupancy information and DepthImg1 stores D1 values, a one bit per-patch metadata to indicate whether or not the reconstructed D1 values of the current patch need to be corrected before being used to reconstruct the point cloud geometry.

The above new metadata can be signaled once for the whole bitstream, or multiple times for each frame or each group of frames being compressed together, which allows selecting different coding schemes for each frame or group of frames. The data field(s) recording value(s) of the above metadata can be directly output to the compressed bitstream(s) or further entropy coded before being output to the compressed bitstream(s).

The decoder 30 of FIG. 9 is modified according to the embodiments of the encoder 51 described with reference to FIGS. 10 to 15.

For the first embodiment, in which the occupancy information is embedded in DepthImg0, the occupancy map is generated according to:

$$\text{Occupied}(u, v) = \begin{cases} \text{false, if } DepthImg0(u, v) == 0 \\ \text{true, if } DepthImg0(u, v) > 0 \end{cases}$$

Also, the depth patches are reconstructed by decreasing D0 values by 1 whenever necessary.

For the second embodiment, in which the occupancy information is embedded in DepthImg1, the occupancy map is generated according to:

$$\text{Occupied}(u, v) = \begin{cases} \text{false, if } DepthImg1(u, v) == 0 \\ \text{true, if } DepthImg1(u, v) > 0 \end{cases}$$

Also, the depth patches are reconstructed by decreasing all DeltaD values by 1.

For the third embodiment, in which the occupancy information is embedded in DepthImg1 and DepthImg1 stores D1 values, the occupancy map is generated according to:

$$\text{Occupied}(u, v) = \begin{cases} \text{false, if } DepthImg1(u, v) == 0 \\ \text{true, if } DepthImg1(u, v) > 0 \end{cases}$$

D1 depth patches are reconstructed by decreasing concerned D1 values by 1 if necessary.

For the fourth embodiment, in which the occupancy information is embedded in DepthImg0, the occupancy map is generated according to:

$$\text{Occupied}(u, v) = \begin{cases} \text{false, if } DepthImg0(u, v) == 0 \\ \text{true, if } DepthImg0(u, v) > 0 \end{cases}$$

Also, the depth patches are reconstructed by decreasing D0 values by 1 whenever necessary and reconstructing depth values from EDD codes.

For the fifth embodiment, in which the occupancy information is embedded in DepthImg1, the occupancy map is generated according to:

$$\text{Occupied}(u, v) = \begin{cases} \text{false, if } DepthImg1(u, v) == 0 \\ \text{true, if } DepthImg1(u, v) > 0 \end{cases}$$

Also, the depth patches are reconstructed by decreasing all EDD codes by 1.

On FIG. 1-15, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 16:
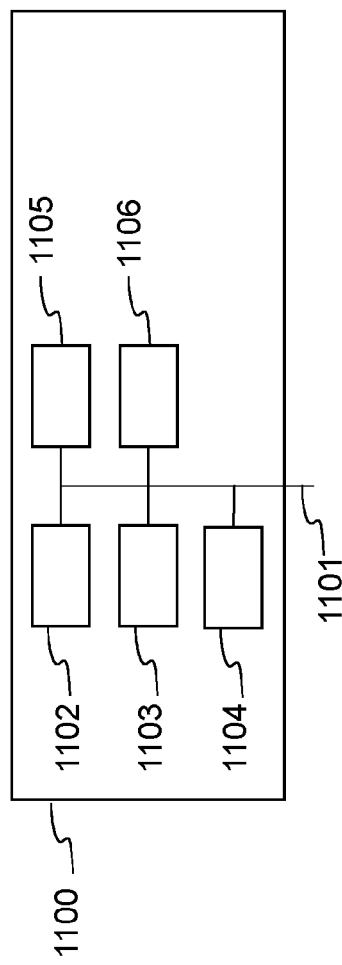
FIG. 16 shows an example of an architecture of a device in accordance with an example of present principles.

FIG. 16 represents an exemplary architecture of a device 1100 which may be configured to implement a method described in relation with FIG. 1-15.

Device 1100 comprises following elements that are linked together by a data and address bus 1101:
- a microprocessor 1102 (or CPU), which is, for example, a DSP (or Digital Signal Processor);
- a ROM (or Read Only Memory) 1103;
- a RAM (or Random Access Memory) 1104;
- an I/O interface 1105 for reception of data to transmit, from an application; and
- a battery 1106.

In accordance with an example, the battery 1106 is external to the device. In each of mentioned memory, the word «register» used in the specification can correspond to area of small capacity (some bits) or to very large area (e.g. a whole program or large amount of received or decoded data). The ROM 1103 comprises at least a program and parameters. The ROM 1103 may store algorithms and instructions to perform techniques in accordance with present principles. When switched on, the CPU 1102 uploads the program in the RAM and executes the corresponding instructions.

RAM 1104 comprises, in a register, the program executed by the CPU 1102 and uploaded after switch on of the device 1100, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the input point cloud is obtained from a source. For example, the source belongs to a set comprising:
- a local memory (1103 or 1104), e.g. a video memory or a RAM (or Random Access Memory), a flash memory, a ROM (or Read Only Memory), a hard disk;
- a storage interface (1105), e.g. an interface with a mass storage, a RAM, a flash memory, a ROM, an optical disc or a magnetic support;
- a communication interface (1105), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

In accordance with an example of the decoding or a decoder, the decoded point cloud is sent to a destination; specifically, the destination belongs to a set comprising:
- a local memory (1103 or 1104), e.g. a video memory or a RAM, a flash memory, a hard disk;
- a storage interface (1105), e.g. an interface with a mass storage, a RAM, a flash memory, a ROM, an optical disc or a magnetic support;
- a communication interface (1105), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi or a Bluetooth interface);
- a rendering device; and
- a display.

In accordance with examples of encoding or encoder, the bitstream (compressed stream) is sent to a destination. As an example, the bitstream is stored in a local or remote memory, e.g. a video memory (1104) or a RAM (1104), a hard disk (1103). In a variant, the bitstream is sent to a storage interface (1105), e.g. an interface with a mass storage, a flash memory, ROM, an optical disc or a magnetic support and/or transmitted over a communication interface (1105), e.g. an interface to a point to point link, a communication bus, a point to multipoint link or a broadcast network.

In accordance with examples of decoding or decoder, the bitstream (compressed stream) is obtained from a source. Exemplarily, a bitstream is read from a local memory, e.g. a video memory (1104), a RAM (1104), a ROM (1103), a flash memory (1103) or a hard disk (1103). In a variant, the bitstream is received from a storage interface (1105), e.g. an interface with a mass storage, a RAM, a ROM, a flash memory, an optical disc or a magnetic support and/or received from a communication interface (1105), e.g. an interface to a point to point link, a bus, a point to multipoint link or a broadcast network.

In accordance with examples, the device 1100 being configured to implement an encoding method described in relation with FIGS. 1 and 9, belongs to a set comprising:
- a mobile device;
- a smartphone or a TV set with 3D capture capability;
- a communication device;
- a game device;
- a tablet (or tablet computer);
- a laptop;
- a still imagecamera;
- a video camera;
- an encoding chip;
- a still image server; and
- a video server (e.g. a broadcast server, a video-on-demand server or a web server).

In accordance with examples, the device 1100 being configured to implement a decoding method described in relation with FIGS. 3 and 10, belongs to a set comprising:
- a mobile device;
- a Head Mounted Display (HMD);
- (mixed reality) smartglasses;
- an holographic device;
- a communication device;
- a game device;
- a set top box;
- a TV set;
- a tablet (or tablet computer);
- a laptop;
- a display;
- a stereoscopic display; and
- a decoding chip.

Figure 17:
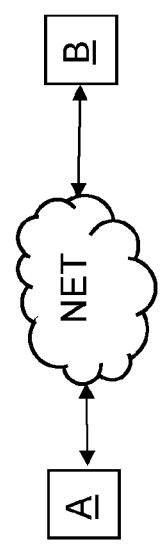
FIG. 17 shows two remote devices communicating over a communication network in accordance with an example of present principles.

According to an example of the present principles, illustrated in FIG. 17, in a transmission context between two remote devices A and B over a communication network NET, the device A comprises a processor in relation with memory RAM and ROM which are configured to implement a method for encoding a colored point cloud as described in relation with FIG. 8 and the device B comprises a processor in relation with memory RAM and ROM which are configured to implement a method for decoding as described in relation with FIG. 9.

In accordance with an example, the network is a broadcast network, adapted to broadcast encoded colored point clouds from device A to decoding devices including the device B.

A signal, intended to be transmitted by the device A, carries the bitstream.

Figure 18:
FIG. 18 shows the syntax of a signal in accordance with an example of present principles.

FIG. 18 shows an example of the syntax of such a signal when the data are transmitted over a packet-based transmission protocol. Each transmitted packet P comprises a header H and a payload PAYLOAD.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, a HMD, smart glasses, and any other device for processing an image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   obtaining an occupancy information indicating whether or not a pixel representative of a projection of a first point of a point cloud onto a projection plane along a projection line is occupied;
   storing in an image said occupancy information with a codeword concatenating bits indicating for positions along the projection line between a first depth value of the first point and a second depth value of a second point of the point cloud projected onto the projection plane along the projection line, whether or not the position is occupied; and
   encoding said image.

2. The method of claim 1, wherein storing said occupancy information comprises shifting the codeword to be stored.

3. The method of claim 1, further comprising encoding a geometry image comprising the first depth value of the first point.

4. The method of claim 2, wherein the method further comprises transmitting information to indicate that the codeword has shifted.

5. A device comprising one or more processors configured to:
   obtain an occupancy information indicating whether or not a pixel representative of a projection of a first point of a point cloud onto a projection plane along a projection line is occupied;
   store in an image said occupancy information with a codeword concatenating bits indicating for positions along the projection line between a first depth value of the first point and a second depth value of a second point of the point cloud projected onto the projection plane along the projection line, whether or not the position is occupied; and
   encode said image.

6. The device of claim 5, wherein storing said occupancy information with said codeword comprises shifting the codeword to be stored.

7. The device of claim 5, the one or more processors being further configured to encode a geometry image comprising the first depth value of the first point.

8. The device of claim 6, wherein the one or more processors are further configured to transmit information to indicate that the codeword has shifted.

9. A method comprising:
   decoding an image storing an occupancy information and a codeword concatenating bits indicating for positions along a projection line between a first depth value of a first point of a point cloud projected onto a projection plane along the projection line and a second depth value of a second point of the point cloud projected onto the projection plane along the projection line, whether or not the position is occupied; and deriving from the decoded image the occupancy information, said occupancy information indicating whether or not a pixel representative of the projection of the first point onto the projection plane is occupied.

10. The method of claim 9, wherein the method further comprises receiving an information indicating the codeword has to be shifted, and shifting the decoded codeword according to said received information.

11. The method of claim 9, further comprising decoding a geometry image comprising the first depth value of the first point.

12. A device comprising one or more processors configured to:
   decode an image storing an occupancy information and a codeword concatenating bits indicating for positions along a projection line between a first depth value of a first point of a point cloud projected onto a projection plane along the projection line and a second depth value of a second point of the point cloud projected onto the projection plane along the projection line, whether or not the position is occupied; and
   derive from the decoded image the occupancy information, said occupancy information indicating whether or not a pixel representative of the projection of the first point onto the projection plane is occupied.

13. The device of claim 12, wherein the one or more processors are further configured to receive an information indicating if the codeword has to be shifted, and to shift the decoded codeword according to said received information.

14. The device of claim 12, the one or more processors being further configured to decode a geometry image comprising the first depth value of the first point.

15. A non-transitory processor-readable medium including instructions for causing one or more processors to perform:
   obtaining an occupancy information indicating whether or not a pixel representative of a projection of a first point of a point cloud onto a projection plane along a projection line is occupied;
   storing in an image said occupancy information with a codeword concatenating bits indicating for positions along the projection line between a first depth value of the first point and a second depth value of a second point of the point cloud projected onto the projection plane along the projection line, whether or not the position is occupied; and
   encoding said image.

16. The non-transitory processor-readable medium of claim 15, wherein the instructions cause the one or more processors to further perform encoding a geometry image comprising the first depth value of the first point.

17. A non-transitory processor-readable medium including instructions for causing one or more processors to perform:
   decoding an image storing an occupancy information and a codeword concatenating bits indicating for positions along a projection line between a first depth value of a first point of a point cloud projected onto a projection plane along the projection line and a second depth value of a second point of the point cloud projected onto the projection plane along the projection line, whether or not the position is occupied; and
   deriving from the decoded image the occupancy information, said occupancy information indicating whether or not a pixel representative of the projection of the first point onto the projection plane is occupied.

18. The non-transitory processor-readable medium of claim 17, wherein the instructions cause the one or more processors to further perform comprising decoding a geometry image comprising the first depth value of the first point.

19. A non-transitory computer-readable medium comprising:
   a stored image storing an occupancy information and a codeword concatenating bits indicating for positions along a projection line between a first depth value of a first point of a point cloud projected onto a projection plane along the projection line and a second depth value of a second point of the point cloud projected onto the projection plane along the projection line, whether or not the position is occupied, said occupancy information indicating whether or not a pixel representative of the projection of the first point onto the projection plane is occupied.

* * * * *